United States Statutory Invention Registration [19]

McQuillan et al.

[11] Reg. Number: H641

[43] Published: Jun. 6, 1989

[54] PROCESS FOR MAKING COATINGS ON GRAPHITE USING INTERCALATED SPECIES

[75] Inventors: Barry W. McQuillan, San Diego; George H. Reynolds, San Marcos, both of Calif.

[73] Assignee: The United States of America as represented by the Secretary of the Air Force, Washington, D.C.

[21] Appl. No.: 220,135

[22] Filed: Jul. 5, 1988

[51] Int. Cl.[4] ..... B05D 3/00

[52] U.S. Cl. ..... 427/299; 427/372.2; 428/408; 428/702

[56] References Cited

U.S. PATENT DOCUMENTS

| | | | |
|---|---|---|---|
| 4,102,937 | 7/1978 | Harris | 260/666 |
| 4,267,210 | 5/1981 | Yajima et al. | 427/226 |
| 4,267,211 | 5/1981 | Yajima et al. | 427/228 |
| 4,440,571 | 4/1984 | Iskikawa et al. | 75/229 |
| 4,605,588 | 8/1986 | Simpson et al. | 428/288 |
| 4,642,271 | 2/1987 | Rice | 428/698 |

OTHER PUBLICATIONS

"Deintercalation Reactions to Form Ceramic Coatings on Graphite Fibers" B. W. McQuillan and G. H. Reynolds, Abstract, Boston, Mass., Dec. 1986.

"Growth of Alumina Fibers from Intercalated Graphite Precursor Fibers" B. W. McQuillan and G. H. Reynolds, Abstract, San Diego, Calif., Jan. 1987.

"Synthesis of Refractory Ceramic Fibers from Intercalated Graphite Fiber Precursors," B. W. McQuillan and G. H. Reynolds, Abstract, Anaheim, Calif., Apr. 87.

"Preparation of Ceramic Fibers by Conversion Intercalated Graphite Fibers" B. W. McQuillan and G. H. Reynolds, Abstract, Pittsburgh, Pa., Apr. 1987.

*Primary Examiner*—John F. Terapane

*Assistant Examiner*—John M. Covert

*Attorney, Agent, or Firm*—Donald J. Singer

[57] ABSTRACT

Carbon-graphite fibers are coated with a protective metal oxide coating by intercalating the fibers with a metal chloride and then deintercalating the chlorine by hydrolysis to form a metal oxide over the fibers. An example using aluminum chloride to form an aluminum oxide coating is described.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MAKING COATINGS ON GRAPHITE USING INTERCALATED SPECIES

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application relates to two companion applications titled PREPARATION OF METAL OXIDE FIBERS FROM INTERCALATED GRAPHITE FIBERS, U. S. application Ser. No. 07/217991, and PRODUCTION OF 10 MICRON DIAMETER HOLLOW ALUMINA FIBERS, U.S. application Ser. No. 07/220/36, both filed on the same date as this application and hereby incorporated by reference as if fully rewritten herein.

BACKGROUND OF THE INVENTION

The invention relates generally to a process for coating fibers, and more specifically to a process for making metal oxide coatings on graphitic carbon fibers and other graphitic material.

Carbon fibers, particularly carbon-graphite fibers, are increasingly valuable as reinforcing materials in a variety of composite structural materials. A common problem with carbon fibers is that the carbon is very susceptible to oxidation especially on graphite basal plane edges, which seriously impairs the desired physical and mechanical properties of the carbon fibers.

The prior art has investigated a very large variety of coating processes and other methods for making carbon fibers more oxidatiopn resistant. While much valuable work has been done, additional improvements are still needed.

It is, therefore, a principal object of the present invention to provide a process for depositing metal oxide coatings on the surface of graphite fibers and other graphitic materials.

It is an advantage of the present invention that the coating material comes from within the fiber and deposits initially at the graphite layer plane edges, thereby forming preferentially at the locations where oxidation is most rapid.

It is another advantage of the present invention that the process is simple to understand and to perform.

SUMMARY OF THE INVENTION

In accordance with the foregoing principles, advantages and objects, the present invention provides a novel process for depositing a metal oxide coating on carbon-graphite fibers. The unique discovery of the present invention is that intercalating, and then deintercalating, the fibers will form a coating on the fiber surfaces.

Accordingly, the invention is directed to a method for coating a graphitic carbon fiber, comprising the steps of intercalating a metal chloride into the fiber and then deintercalating the chlorine from the fiber by hydrolysis to form a metal oxide on the fiber surface.

The hydrolysis should be performed at progressively higher temperatures over a range of about 100° C. to a temperature at which oxidation of the graphite itself occurs at a faster rate than the hydrolysis reaction.

The invention also includes using aluminum chloride as the metal chloride and aluminum oxide as the metal oxide.

The invention also includes a method for coating a graphitic carbon fiber, comprising intercalating a metal-bearing species into the carbon fiber and then deintercalating the carbon fiber to form a metal-bearing ceramic species on the fiber surface.

The invention further includes the metal oxide and metal species coated carbon fibers made according to the disclosed methods.

DETAILED DESCRIPTION

A metal chloride is first intercalated into carbon-graphite fibers by standard techniques well known in the art. Carbon-graphite fibers, or simply graphite fibers, are carbon fibers where the carbon is primarily in graphite form. Such graphitic carbon fibers, and other graphitic carbon based materials, can be prepared or obtained in varying degrees of graphitization. The present invention, and the cross-referenced companion applications, will work with any carbon fiber or other carbon material displaying a graphitic character to a degree sufficient to provide layer planes between which intercalation may take place.

For example, to intercalated aluminum chloride ($AlCl_3$) into tows of Union Carbide P-100 graphite fibers (approximately 2000 graphite fibers in a continuous tow), the fibers are heated at ~300° C. in air to remove any sizing. The fibers are then placed inside a Pyrex tube to which aluminum chloride and chlorine gas ($Cl_2$) are added. The $Cl_2$ is frozen in the tube and the tube sealed under vacuum. The sample is next heated to generate a sufficient vapor pressure of aluminum chloride. After 1–3 days, the tube is cooled and opened in a drybox. The added AlCl3 and $Cl_2$ will generally be sufficient to produce $C_n{+}AlCl_4{-}(n{\sim}36)$ in-between the crystalline layers comprising the graphite fibers.

The intercalated fibers are next hydrolyzed by bubbling nitrogen gas through water and then over the intercalated fibers at very slowly increasing temperatures from 100° to below 600° C. in steps of aboul 50 to 100 degrees. Within a week at 100° C., white material representing the metal oxide will form on the fiber surfaces.

In this hydrolysis of $C_n{+}AlCl_4{-}$, the intercalated $AlCl_4{-}$ should act like $AlCl_3$ and form AlOCl at low temperatures as shown in the equation below. AlOOH should then form fairly readily at temperatures above 400° C., and $Al_2O_3$ form at temperatures near and above 600° C.

$$AlCl_3 \xrightarrow[25\text{–}250^\circ\ C.]{+H_2O} AlOCl \xrightarrow[\sim 500^\circ\ C.]{+H_2O}$$

$$AlOOH \xrightarrow[\sim 600^\circ\ C.]{} Al_2O_3$$

Extreme care should be taken to slowly increase the temperature at which hydrolysis takes place because the graphite will slowly begin to oxidize at about 600° C. The hydrolysis should preferably be performed at temperatures at which the hydrolysis reaction occurs at a faster rate than oxidation of the graphite.

The disclosed process successfully demonstrates the use of intercalating into, and then deintercalating from, fibers to form a coating or surface layer on the fibers. Although the disclosed use is specialized, it will find application in other areas where application of surface coatings is required. Extension of the underlying methodology of the disclosed processes using different intercalants and different deintercalation reactions will provide other coatings. Other metal-bearing species, such as metal halides or metal nitrates, can be intercalated into graphite or other graphitic material and then deintercalated by hydrolysis, or by processes other than hydrolysis.

Those with skill in the art will see that the disclosed method of making coatings will work as well on other carbon materials such as woven carbon fabrics and bulk graphitic materials.

It is understood that other modifications to the invention as described may be made, as might occur to one with skill in the field of the invention. Therefore, all embodiments contemplated have not been shown in complete detail. Other embodiments may be developed without departing from the spirit of the invention or from the scope of the claims.

We claim:

1. A method for coating a graphitic carbon fiber, comprising the steps of:

(a) intercalating a metal chloride into the carbon fiber; and, (b) deintercalating the chlorine from the carbon fiber by hydrolysis to form a metal oxide on the fiber surface.

2. The method according to claim 1, wherein the hydrolysis is performed at progressively higher temperatures over the range of about 100° C. to temperature at which oxidation of the carbon occurs at a faster rate than the hydrolysis reaction.

3. The method according to claim 1, wherein the metal chloride is aluminum chloride and the metal oxide is aluminum oxide.

4. A method for coating a graphitic carbon fiber, comprising:

(a) intercalating a metal-bearing species into the carbon fiber; and.

(b) deintercalating from the carbon fiber to form a metal-bearing species ceramic on the fiber surface.

* * * * *